UNITED STATES PATENT OFFICE.

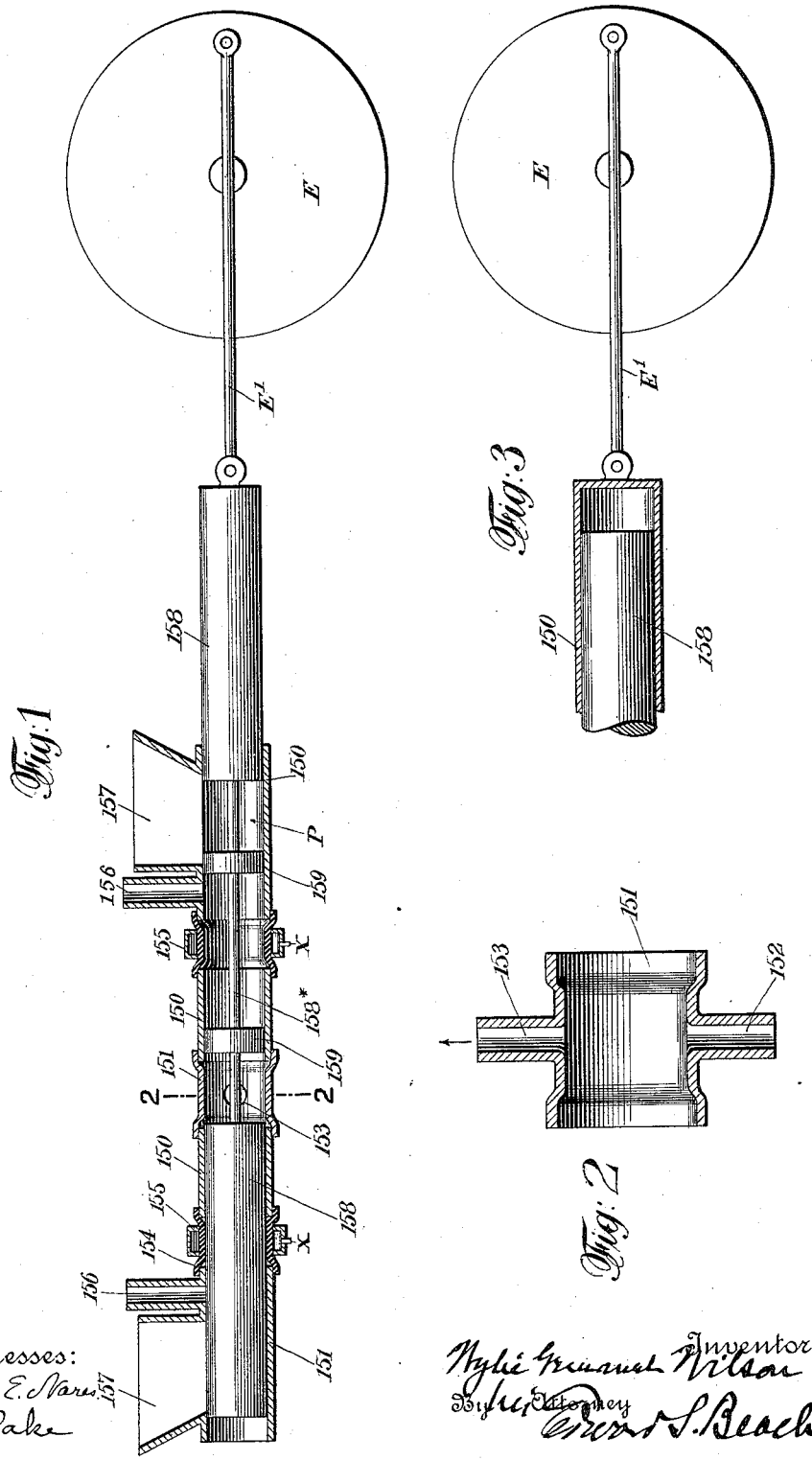

WYLIE GEMMEL WILSON, OF ELIZABETH, NEW JERSEY, ASSIGNOR TO W. G. WILSON COMPANY, OF MONTCLAIR, NEW JERSEY, A CORPORATION OF NEW JERSEY.

CONVEYING AND DISCHARGING APPARATUS.

1,069,507.  Specification of Letters Patent.  Patented Aug. 5, 1913.

Original application filed July 1, 1911, Serial No. 636,501. Divided and this application filed August 29, 1911. Serial No. 646,673.

*To all whom it may concern:*

Be it known that I, WYLIE GEMMEL WILSON, a subject of the King of Great Britain, residing at Elizabeth, in the county of Union and State of New Jersey, have invented certain new and useful Improvements in Conveying and Discharging Apparatus, of which the following is a specification, reference being had therein to the accompanying drawings.

This invention relates to a machine for automatically transferring concrete-forming or other material from a source or sources of supply to a place of use, where the material is forcibly discharged.

In my pending application Serial No. 636,501, filed July 1, 1911, I have shown various forms of apparatus for such purpose, and the present invention is one of them.

In the accompanying drawings, Figure 1 is a sectional view of my present form of apparatus provided with a plurality of material-receiving inlets in its casing and having a therein-contained reciprocating, pocketed conveyer, the casing being stationary. Fig. 2 is a section, at line 2—2, of Fig. 1, and shows the fluid inlet and discharge port of the conveyer casing. Fig. 3 is a sectional view of a portion of a supposed stationary conveyer similar to that shown in Fig. 1, and of a reciprocatable conveyer-casing.

In Fig. 1, the conveyer-casing is straight and tubular, and made up of tubular sections 150 and 151, the latter having a fluid inlet port 152 and a fluid outlet port 153. These ports are shown opposite one another and at right angles to the lengthwise axis of the casing and therein-contained pocketed conveyer. The casing sections on each side of section 151 are provided with compressible glands 154 incasing compressed air-casings 155 to form air-locks for the purpose described, and as more fully illustrated, in my said application Serial No. 636,501, the glands 154 being rubber or other elastic tubular sections which couple sections 150 and 151 and which are in turn inclosed by the air-casings 155 provided with an air inlet $x$. When air is admitted into the chamber of the casings 155, the elastic glands 154 are pressed inwardly and form an airtight joint with the cylindrical solid portions of the conveyer 158, hereinafter described. The casing is also provided with an air-vent 156 adjacent to hopper 157, and is shown provided with two air-vents and with two hoppers, each hopper communicating at its bottom with the chamber of the conveyer-casing, and so also each vent 156. The casing is supposed to be stationary, and the conveyer structure 158 is reciprocable by any suitable mechanical means, such as eccentric E and eccentric rod E' connecting the conveyer structure with the eccentric. The conveyer comprises a pair of piston-like plugs 158 spaced apart and held together in line by a rod 158* on which are a pair of disks 159 of the same diameter as piston-like plugs 158. These disks are spaced apart, and also are each spaced apart from the adjacent piston-like plug 158 to form material-receiving pocket P therebetween. The plugs 158 and disks 159 are a close sliding fit within the casing. Each plug 158 is adapted to close one of the hoppers 157 and successively to uncover the lower end of the hopper for admission of material into a pocket P. By reciprocating the conveyer, each of the two pockets shown is successively brought into a section 151, when fluid under pressure forced into the inlet 152 will drive any material out of the pocket lying between the fluid inlet and fluid outlet ports through the discharge port 153. The purpose of separating disks 159 one from another is to minimize the closure of the pressure fluid inflow and outlet during the operation of the machine, in order that there may be practically a continuous push of the pressure fluid on the material in the discharge port or pipe 153, which in practice will be considerably prolonged. The purpose of the air-vents 156 is to permit escape from the pockets of the compressed fluid therein before the pockets come opposite the material-inlet ports or bottom openings of the hoppers; otherwise the compressed air in a pocket that comes under an inlet for material would blow the material back or out of the hopper. This is one of the important features of my invention, and has a wide range of applicability in different types of machines of this class.

It will be obvious to all mechanics that, if desired, the conveyer-casing might be reciprocated and the pocketed conveyer structure be stationary; and in Fig. 3 I have sufficiently illustrated such a reversal of the movement of the casing and conveyer structure to enable mechanics to construct the alternative form of apparatus if so desired.

What I claim is:—

1. The combination of an open-ended conveyer casing having between its ends an inlet port for admission of material and a vent adjacent thereto and open to the atmosphere, and also having between its ends a fluid-admission port and a discharge port adapted to communicate one with another through a conveyer pocket; a conveyer having a pocket and also having at each side of the pocket a wall in air-tight connection with the casing; means moving the conveyer pocket from a position opposite the material-admission port into a position between the fluid-admission and escape-ports and to move the pocket from this latter position into registration with the material-admission port; the conveyer pocket when in communication with the material-admission port being also in communication with said vent.

2. The combination of a straight tubular conveyer casing having, between its ends, an inlet port for material and a vent adjacent thereto but removed from said port, a fluid inlet and a discharge port located in the walls of the casing so as to communicate transversely therethrough; and a pocketed conveyer slidably mounted within the casing in substantially air-tight connection therewith; the casing and conveyer being movable one in relation to the other and means for reciprocating one of them in relation to the other.

In testimony whereof I have affixed my signature in presence of two witnesses.

WYLIE GEMMEL WILSON.

Witnesses:
 EDWARD E. BLACK,
 F. E. NARES.

Copies of this patent may be obtained for five cents each, by addressing the "Commissioner of Patents, Washington, D. C."